(12) United States Patent
Winkelman

(10) Patent No.: US 12,093,244 B1
(45) Date of Patent: Sep. 17, 2024

(54) DISTURBED SYSTEMS IMPACT EVALUATION AND OPERATION TEST GENERATION

(71) Applicant: The Boeing Company, Arlington, VA (US)

(72) Inventor: Jessica Lain Winkelman, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/316,177

(22) Filed: May 11, 2023

(51) Int. Cl.
*G06F 7/00* (2006.01)
*G06F 16/23* (2019.01)

(52) U.S. Cl.
CPC .................. *G06F 16/2365* (2019.01)

(58) Field of Classification Search
CPC .. G06F 16/0234; G06F 16/355; G06F 16/358; G06F 16/3344; G06F 16/2468; G06F 16/328; G06F 16/3338; G06F 16/248; G06F 3/04842; G06F 3/04886; G06F 3/04817; G06F 3/048; G06Q 30/02; G06Q 30/0641; G06Q 30/016; G06Q 30/0283
See application file for complete search history.

(56) References Cited

U.S. PATENT DOCUMENTS

| | | | |
|---|---|---|---|
| 10,109,115 B2 * | 10/2018 | Rajpathak | G07C 5/0808 |
| 2014/0279707 A1 * | 9/2014 | Joshua | G06Q 30/0283 701/1 |
| 2014/0282256 A1 * | 9/2014 | Fish | G07C 5/008 715/835 |
| 2015/0170439 A1 * | 6/2015 | Chen | G06Q 30/02 701/31.4 |
| 2020/0184743 A1 * | 6/2020 | Merg | G07C 5/008 |
| 2021/0141905 A1 * | 5/2021 | Nguyen | G06F 21/577 |
| 2024/0037022 A1 * | 2/2024 | Timmermann | G06F 11/3664 |

\* cited by examiner

*Primary Examiner* — Mohammad A Sana
(74) *Attorney, Agent, or Firm* — Yee & Associates, P.C.

(57) ABSTRACT

A method of evaluating system impact of wiring updates for a vehicle is provided. The method comprises receiving input of the wiring updates and retrieving operational and structural information about the vehicle from several databases. Disturbed system impact metrics from the updates are determined according to the operational and structural information about the vehicle. A first set of test procedures correlated with the disturbed system impact metrics are generated from a maintenance manual. An impact estimate of the first set of test procedures are generated in near real-time. A second set of test procedures is generated from non-maintenance manual sources for wires not referenced in the maintenance manual. The first and second sets of procedures are combined into a single optimized flow according to user-specified parameters, and a new test procedure is created for addition to the maintenance manual based on the single optimized flow.

20 Claims, 10 Drawing Sheets

500

TASK 26-11-01-211-801

2. <u>Engine Fire Detector Inspection</u>

TBC    TBC 001-006, 008, 010, 012, 013, 016, 017, 032, 033, 049, 055, 077, 098, 113, 133, 181, 183, 219, 227, 229,
TBC    235, 238, 240, 245
TBC    NOTE: ETOPS SIGNIFICANT SYSTEM. Steps in this task may disturb an ETOPS significant system. If
TBC    accomplished on an ETOPS aircraft refer to MPM Chapter 46.
TBC    TBC ALL A. References

| Reference | Title |
|---|---|
| 26-11-01-990-801 | Figure: Engine Fire Detector Element Installation (P/B 401) |

B. Consumable Materials

| Reference | Description | Specification |
|---|---|---|
| G50541 | Tubing - Host Shrinkable, Teflon Sleeve (TFE-R-5/8-X) | AMS-DTL-23053/12 |
| G50544 | Tubing - Host Shrinkable, Teflon Sleeve (TFE-R-1/2-X) | AMS-DTL-23053/12 |

C. Engine Fire Detector Inspection

SUBTASK 26-11-01-212-001

(1) Make sure that there is no contact between the forward transponder of the upper fan case engine fire/overheat detector and the strut insulation blanket (detail F of Figure 26-11-01-990-801.

SUBTASK 26-11-01-300-001

(2) If there is contact and the wire insulation is damaged, repair the wire as described below and change the routing of the wire as shown on detail F of Figure 26-11-01-990-801.

(a) If no contact is found and the wires are routed as shown on detail F of Figure 26-11-01-990-801, no further action is required.

SUBTASK 26-11-01-630-001

(3) Disconnect the lug from the fire/overheat transponder.

SUBTASK 26-11-01-200-002

(4) Cut a sufficient length of TFE-R 5/8-X tubing, G50541 or TFE-R-1/2-X tubing, G50544 to cover the worn area. The sleeve must be long enough to exceed the length of the damage by approximately 0.4 in. (10.2 mm).

SUBTASK 26-11-41-200-003

(5) Heat the sleeve at 700°F (371°C) maximum until shrinking operation is completed.

SUBTASK 26-11-01-430-001

(6) Reconnect the lug on the fire detection transponder.

EFFECTIVITY: TBC ALL

D633AM101-TBC 26-11-01
Page 601
Jan 15/2020

FIG. 5

DISTURBED SYSTEMS IMPACT EVALUATION AND OPERATION TEST GENERATION

BACKGROUND INFORMATION

Technical Field

The present disclosure relates generally to data management systems, and more specifically to combining test procedures from standard sources and non-standard sources into new standardized process flows.

Background

When airplane electronic or electrical systems are updated with new wiring, the updated systems and wiring need to be verified for correct implementation and continued correct operations. New wiring will typically impact multiple aircraft wire connectors and wire splices that include existing wiring that supports a range of other systems. The continued integrity of this other wiring that is disturbed in the update process also needs to be verified. Even simple wiring updates can involve disturbing connectors that carry wires that support many other systems.

Verifying the integrity of systems disturbed during an aircraft wiring update or troubleshooting activity is a major driver of maintenance efforts and airplane out-of-service time. Developing efficient disturbed system operational check procedures can take months of specialist engineering effort for even moderate size wiring changes.

Therefore, it would be desirable to have a method and apparatus that take into account at least some of the issues discussed above, as well as other possible issues.

SUMMARY

An illustrative embodiment provides a computer-implemented method of evaluating system impact of wiring updates for a vehicle. The method comprises receiving input of the wiring updates and retrieving operational and structural information about the vehicle from a number of databases. A number of disturbed system impact metrics resulting from the wiring updates are determined according to the operational and structural information about the vehicle. A first set of test procedures correlated with the disturbed system impact metrics are generated from a maintenance manual. An impact estimate of the first set of test procedures are generated in near real-time. A second set of test procedures is generated from non-maintenance manual sources for wires not referenced in the maintenance manual. The first set of test procedures are combined with the second set of test procedures into a single optimized process flow according to user-specified optimization parameters, and a new standard test procedure is created for addition to the maintenance manual based on the single optimized process flow.

Another illustrative embodiment provides a system for evaluating system impact of wiring updates for a vehicle. The system comprises a storage device that stores program instructions and one or more processors operably connected to the storage device and configured to execute the program instructions to cause the system to: receive input of the wiring updates; retrieve operational and structural information about the vehicle from a number of databases; determine, according to the wiring updates and operational and structural information about the vehicle, a number of disturbed system impact metrics resulting from the wiring updates; generate, from a maintenance manual, a first set of test procedures correlated with the disturbed system impact metrics; generate, in near real-time, an impact estimate of the first set of test procedures; generate, from non-maintenance manual sources, a second set of test procedures for wires not referenced in the maintenance manual; combine the first set of test procedures with the second set of test procedures into a single optimized process flow according to user-specified optimization parameters; and create a new standard test procedure for addition to the maintenance manual based on the single optimized process flow.

Another illustrative embodiment provides a computer program product for evaluating system impact of wiring updates for a vehicle. The computer program product comprises a computer-readable storage medium having program instructions embodied thereon to perform the steps of: receiving input of the wiring updates; retrieving operational and structural information about the vehicle from a number of databases; determining, according to the wiring updates and operational and structural information about the vehicle, a number of disturbed system impact metrics resulting from the wiring updates; generating, from a maintenance manual, a first set of test procedures correlated with the disturbed system impact metrics; generating, in near real-time, an impact estimate of the first set of test procedures; generating, from non-maintenance manual sources, a second set of test procedures for wires not referenced in the maintenance manual; combining the first set of test procedures with the second set of test procedures into a single optimized process flow according to user-specified optimization parameters; and creating a new standard test procedure for addition to the maintenance manual based on the single optimized process flow.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 depicts an example illustration of data stored in an AMM database which can be used with the illustrative embodiments;

DETAILED DESCRIPTION

The illustrative embodiments recognize and take into account that new wiring will typically impact multiple aircraft wire connectors and wire splices that include existing wiring that supports a range of other systems. The continued integrity of this other wiring that is disturbed in the update process also needs to be verified. Even simple wiring updates can involve connectors that carry wires that support many other systems.

The illustrative embodiments also recognize and take into account that the resulting requirement for verification of these disturbed systems can be met in a straight-forward manner during airplane production by the already extensive system verification tests conducted as part of the airplane build process. However, for wiring changes introduced in retrofit to update an already built and in service aircraft, the requirement for verification of these disturbed systems can drive extensive and time consuming additional testing that can dominate the aircraft lay-up time period required to implement the updated wiring.

The illustrative embodiments provide a Disturbed Systems Tool that quantifies disturbed systems impacts for designers and automatically generates optimized operational check procedures in a timely manner to verify the continued integrity of disturbed systems. This tool has the potential to save hundreds of hours per service bulletin or aircraft lay-up as well as to greatly simplify systems and wiring troubleshooting.

Figure 1:
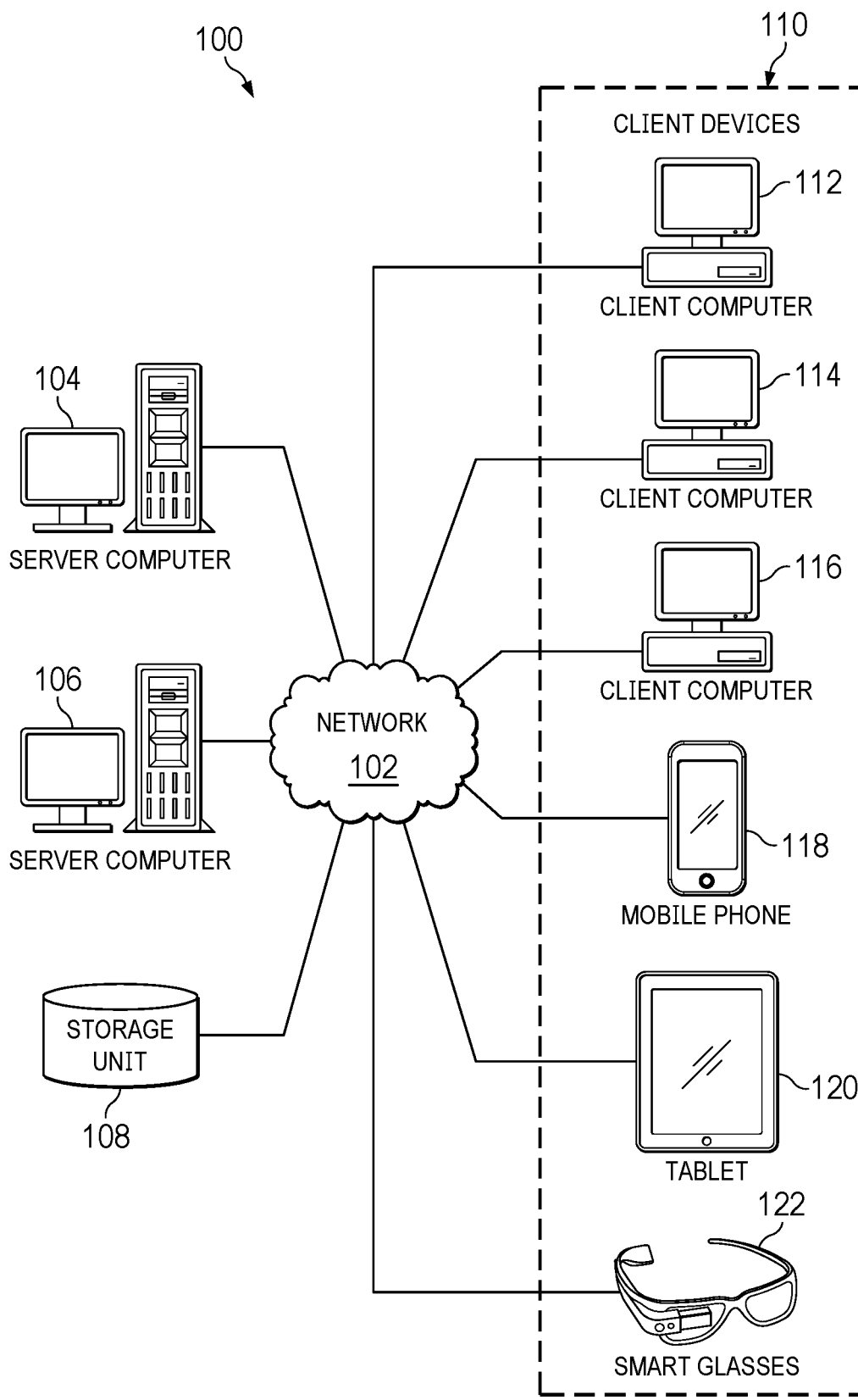
FIG. 1 is a pictorial representation of a network of data processing systems in which illustrative embodiments can be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
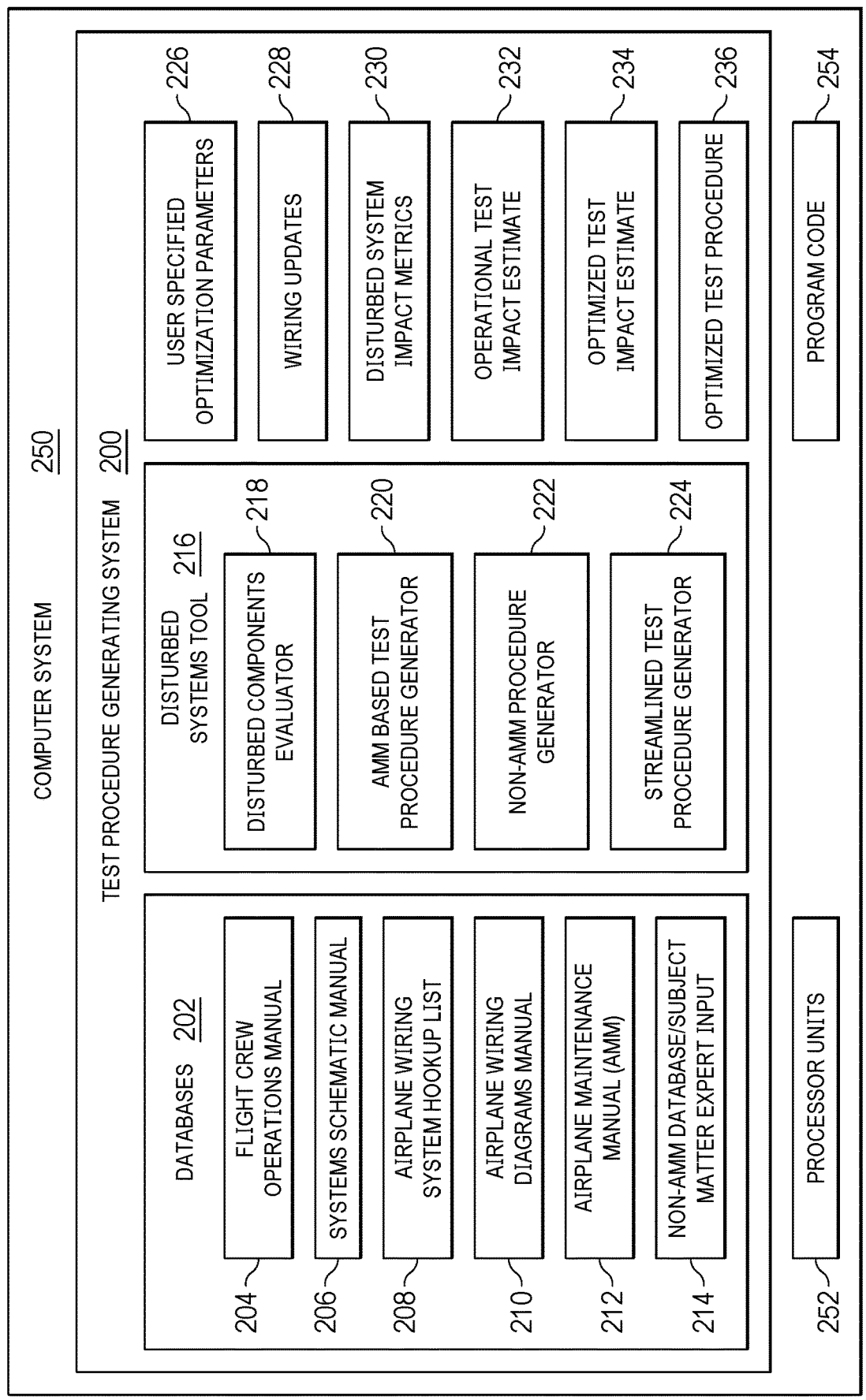
FIG. 2 is an illustration of a block diagram of a test procedure generating system in accordance with an illustrative embodiment.

With reference now to FIG. 2, an illustration a block diagram of a test procedure generating system is depicted in accordance with an illustrative embodiment. In this illustrative example, test procedure generating system 200 includes components that can be implemented in hardware such as the hardware shown in network data processing system 100 in FIG. 1.

Test procedure generating system 200 comprises a disturbed systems tool 216 that generates an optimized test procedure 236 in response to wiring updates 228 for a vehicle such as an aircraft.

To generate the optimized test procedure 236, the disturbed systems tool 216 accesses a number of databases 202. The databases 202 might include a flight crew operations manual 204, systems schematic manual 206, airplane wiring system hookup list 208, airplane wiring diagram manual 210, airplane maintenance manual (AMM) 212, and non-AMM/subject matter expert input 214.

Disturbed systems tool 216 comprises a disturbed components evaluator 218 determines initial disturbed system impact metrics 230 resulting from the wiring updates 228. AMM based test procedure generator 220 cross references the wiring updates 228 with AMM based procedure references and produces an operation test impact estimate 232. Non-AMM procedure generator 222 searches for non-AMM solutions for disturbed wires that are not referenced in the AMM 212.

Streamlined test procedure generator combines the AMM based test procedures and non-AMM test procedures into the optimized test procedure 236 according to user specified optimization parameters 226 and can also generate an optimized test impact estimate 234.

Test procedure generating system 200 can be implemented in software, hardware, firmware, or a combination thereof. When software is used, the operations performed by test procedure generating system 200 can be implemented in program code configured to run on hardware, such as a processor unit. When firmware is used, the operations performed by test procedure generating system 200 can be implemented in program code and data and stored in persistent memory to run on a processor unit. When hardware is employed, the hardware can include circuits that operate to perform the operations in test procedure generating system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
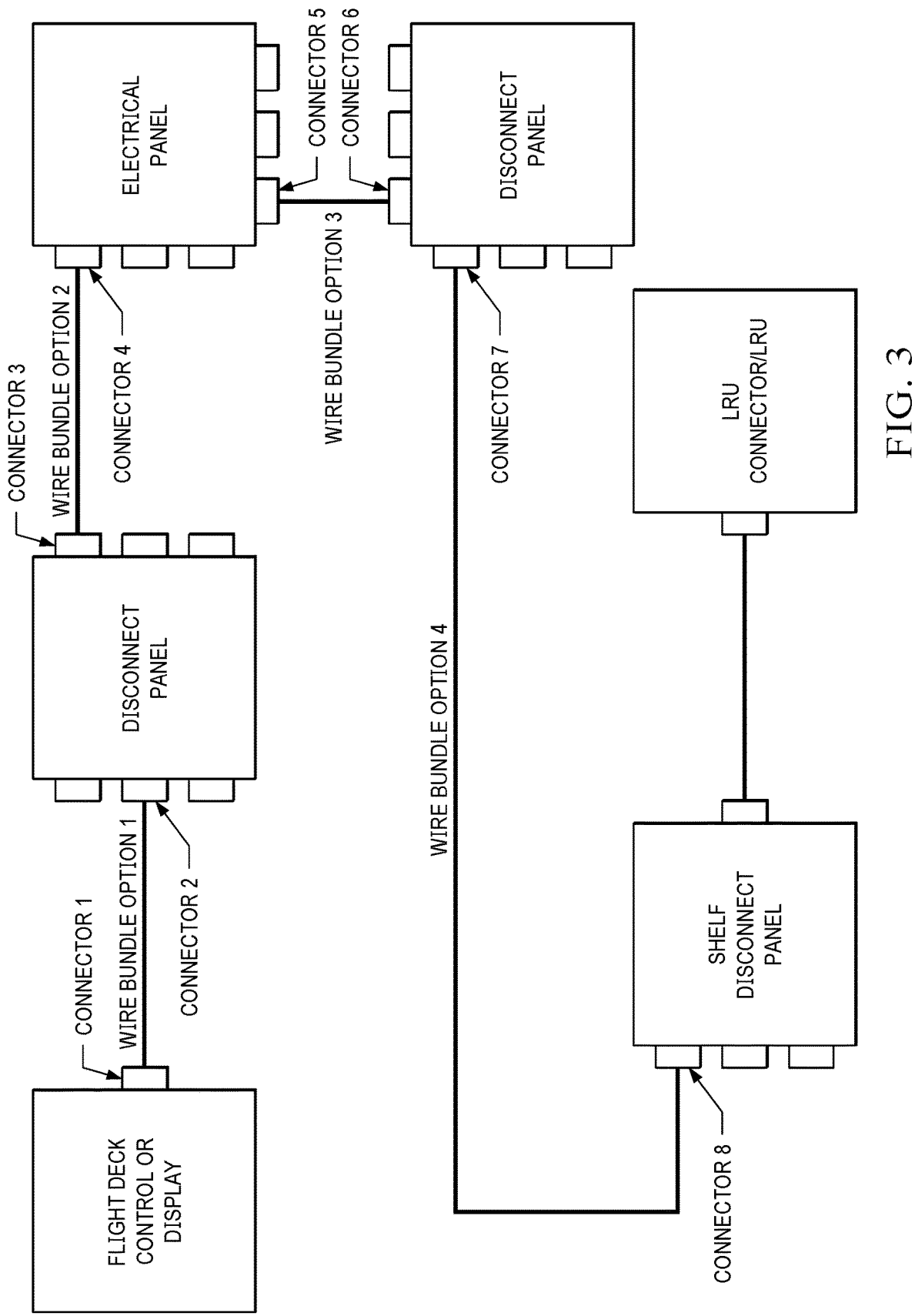
FIG. 3 depicts a pictorial representation of an example wiring design path selection to which the illustrative embodiments can be applied.

FIG. 3 depicts a pictorial representation of an example wiring design path selection to which the illustrative embodiments can be applied. Currently, there is not an efficient way for aircraft wire and installation designers to determine the disturbed systems impact of a wiring change. This lack of determination can lead to wiring designs that meet all of the existing requirements (e.g., wire types, length, and separation from other wiring) but result in onerous disturbed systems test requirements for retrofit updates.

In many cases there may be alternative design choices. For example, alternative connectors options as shown in FIG. 3 would reduce the disturbed systems testing required. The illustrative embodiments provide means for wiring and installation designers to estimate the disturbed systems impact of design options.

There is also currently no effective tool support to develop efficient operational tests to verify the continued integrity of disturbed systems. A common approach is to apply the full systems operational test for each of the disturbed systems. This approach is performed for production aircraft as part of aircraft build checkout and is thus not an issue. However, for retrofit implementations this approach can result in extensive testing of non-impacted functions and may not cover the disturbed wires integrity, resulting in potentially extensive aircraft downtime.

An Operational Check (OPC) is a task to determine that an item is fulfilling its intended purpose. The check does not require quantitative tolerances. Rather, it is a failure finding task.

A Functional Check is a quantitative check to determine if one or more functions of an item perform within specified limits.

The modifications involved in the addition of wiring do not replace existing components or computers, they simply interrupt the system at the connector plug-to-jack interface. The need for the disturbed system testing is to verify the continued integrity of the impacted connections/wiring after the wiring changes are complete. This verification is a failure finding task (operational check) and not a quantitative check (functional check) task. Therefore, an operational check based approach is appropriate. The illustrative embodiments develops specific operational checks for disturbed wires using Airplane Maintenance Manual (AMM) tasks where these are available.

Another open need in disturbed systems testing is the means for the efficient execution of a potentially large series of different operational checks of disturbed systems. A typical approach would be to execute these tests in series, with each test being a stand-alone process requiring a specific test set-up and test shut down procedure. Different tests require applying different aircraft configurations to set up, for example hydraulics on, in-air, landing gear slugs installed, and then removed during the test shut down. This approach can lead to an extended, manpower intensive series of tests. The illustrative embodiments include means to combine tests with the same or similar test set-ups/airplane configurations into common sequences to significantly optimize the airplane changes required in testing. Such combined testing can significantly reduce the test runtime and effort or alternatively reduce tooling or the number of mechanics required to execute the tests.

Identifying disturbed wires and systems and developing applicable operational checks to verify continued integrity is also of considerable potential value in trouble shooting scenarios.

A common trouble shooting task is a continuity check on a suspected damaged wiring path. To perform a continuity check, connectors at each end of the suspect wire segment are disconnected and the electrical continuity of the wire is checked using a multi-meter with leads connected to the appropriate pin at each end. The respective ends of the wire under test may be at widely separated places on the aircraft for example the empennage area and the electrical equipment-bay in the forward portion of the aircraft. This necessitates multiple mechanics, intrusive set up and coordination during the testing. The opening of the connectors for this test also introduces the potential for disturbing other systems with wiring on the connectors, for example via a pushed pin where a connector pin is pushed back into the connector and does not make a solid contact when reconnected (which is not a remote occurrence).

The illustrative embodiments generate an operational check to verify the suspect wire's integrity (or loss of integrity) without requiring a continuity check and the associated connector opening. If a continuity check or other connector opening step is required, the illustrative embodiments can identify the disturbed systems and the associated operational tests to verify their continued integrity after a disconnect/reconnect of a connector.

The illustrative embodiments comprise a web or cloud based tool or service that interacts with a number of existing and modified databases to provide multiple disturbed systems impact data and optimized disturbed systems operational test procedures for wire updates (including connection/disconnection of specific connectors) of interest, specific aircraft and system effectivities (or specific configurations), and optimization targets specified by the user.

Figure 4:
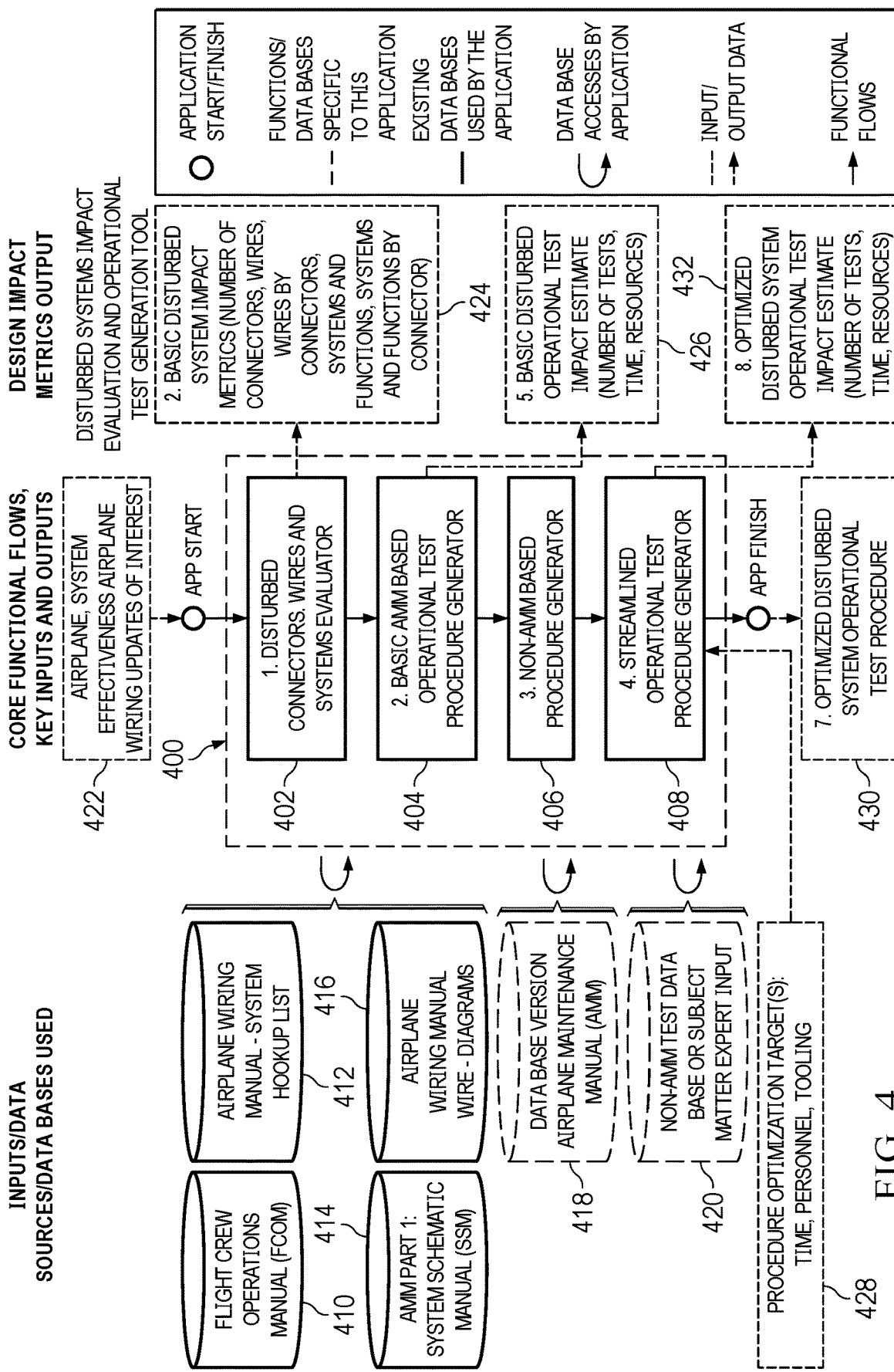
FIG. 4 depicts data associated data flows and data sources for a disturbed systems tool in accordance with an illustrative embodiment.

FIG. 4 depicts data associated data flows and data sources for a disturbed systems tool in accordance with an illustrative embodiment. FIG. 4 illustrates an example implementation of test procedure generating system 200 in FIG. 2.

The disturbed systems tool 400 comprises four top level functional elements: disturbed components (connectors, wires, and systems) evaluator 402, an Airplane Maintenance Manual (AMM) based test procedure generator 404, non-AMM procedure generator 406, and streamlined test procedure generator 408. These primary functions 402-408 access multiple databases 410, 412, 414, 416.

The disturbed components evaluator 402 develops an initial impact assessment and provides the inputs to AMM based test procedure generator 404. AMM based procedure references are developed as an initial operational check procedure, and another level of impact evaluation based on this data is developed. There may also be some disturbed wires for which AMM based procedure references are not available. These non-AMM covered disturbed wires are then addressed by the non-AMM procedure generator 406 via subject matter expert inputs or from a database of previously encountered non-AMM covered disturbed wire procedures. The AMM and non-AMM operational check procedures are then combined into a common set and various optimization options are applied per user inputs to streamline and optimize the overall operational check procedure flow.

The disturbed components evaluator 402 receives as input airplane and system effectivities and airplane wiring updates of interest 422 and cross references the wire or wire path updates and/or impacted connectors and splices to effectivity-specific data in the databases 410, 412, 414, 416. In the present example, database 410 stores a flight crew operational manual. Database 412 stores an airplane wiring manual containing a system hookup list. Database 414 stores a system schematic manual. Database 416 stores an airplane wiring manual containing wire diagrams.

The disturbed components evaluator 402 makes the disturbed component data from databases 410, 412, 414, 416 available to subsequent functions and also uses it to develop an initial set of impact magnitude metrics 424. Impact magnitude metrics 424 might include, for example, numbers of impacted connectors, wires, number of impacted wires by connectors, number of impacted systems and functions, systems, and functions by connectors. Wiring and installation designers can use these metrics to make routing decisions.

The AMM based test procedure generator 404 takes the impacted component set developed in the prior disturbed components evaluator 402 and cross references these with an AMM database 418 to develop a corresponding set of AMM procedure references. This set of AMM procedure references is used to develop a refined update, based on an operational test impact estimate 426 of the disturbed systems impacts. The operational test impact estimate 426 might include for example, the number of test, time required for the tests, and resources required for the tests.

The AMM based test procedure generator 404 also provides a list of non-AMM reference covered wires for use by the following functions.

Non-AMM procedure generator 406 takes the list of non-AMM reference covered wires developed by the AMM based test procedure generator 404 and cross references these with the non-AMM test database 420, which is populated with prior non-AMM based operational checks developed and cataloged from prior changes or with subject matter expert (SME) developed reference procedures. Any SME developed reference procedures are added to database 420 after appropriate validation steps. This function then adds the non-AMM procedure references to the AMM procedure reference list to complete the impacted wire operational check procedure check list.

The streamlined test procedure generator 408 integrates the sets of AMM and non-AMM based test procedures and optimizes the integrated procedures per user-specified optimization targets 428 to generate an optimized test procedure 430. The user can optimize the integrated operational test procedures by choosing, for example, between tooling, length of procedure, allowed configurations, or minimizing configuration changes and tooling. Tooling optimization can include avionics tooling only or a tooling exclusion like no rig pins. This optimization allows configuration of the test procedure to be aligned with the hangar and supply limitations of the facility in question. Along with the optimized test procedure 430, streamlined test procedure generator 408 uses the optimized procedure to output a further refined impact estimate 432.

It should be emphasized that disturbed systems tool 400 is not limited to used with aircraft and can be applied to any vehicle requiring rewiring impact assessment such as automobiles and watercraft.

FIG. 5 depicts an example illustration of data stored in an AMM database which can be used with the illustrative embodiments. FIG. 5 shows an example page from an AMM to illustrate the type of data that is associated with a given procedure reference in database 418.

Figure 6:
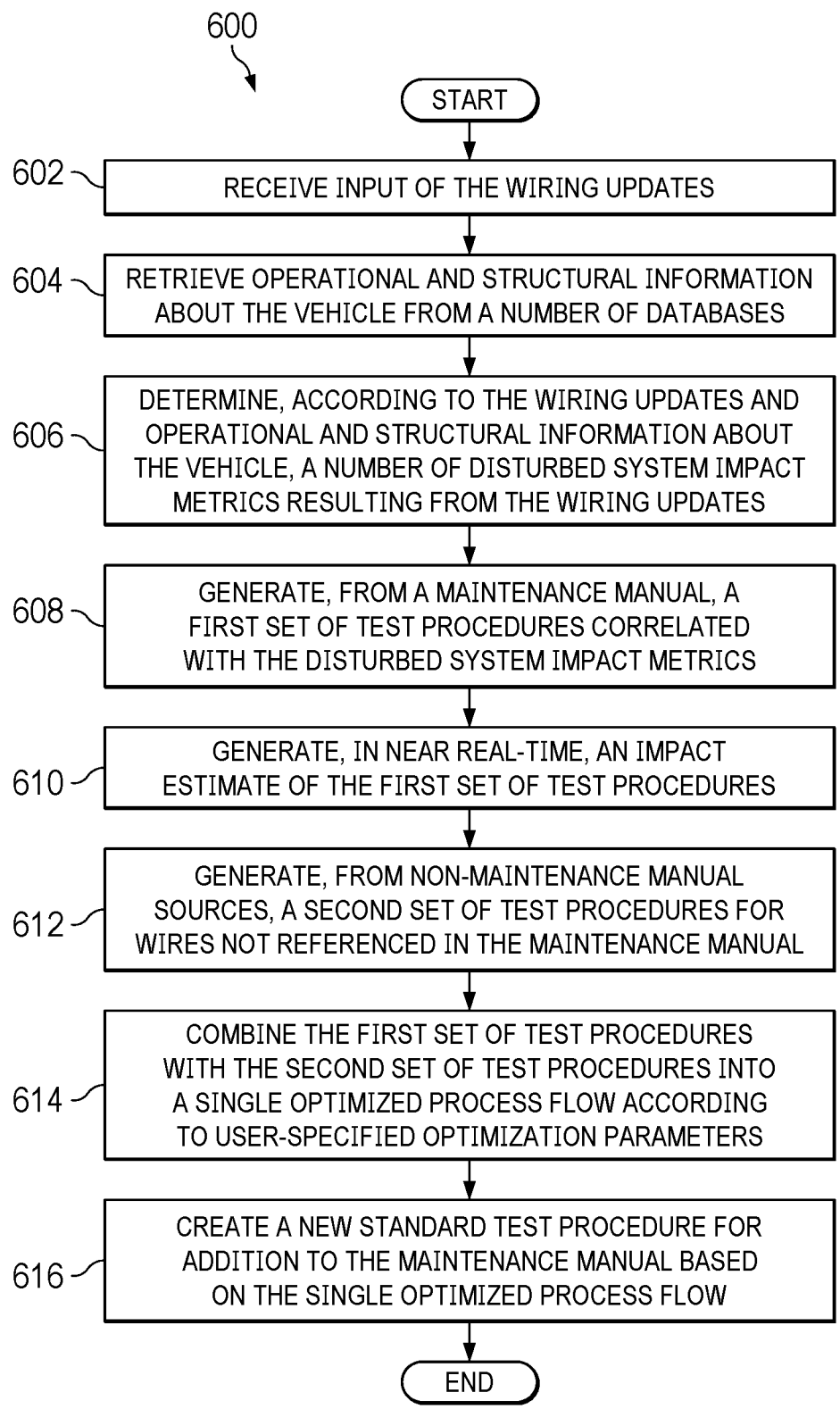
FIG. 6 depicts a flowchart of a process for evaluating system impact of wiring updates for a vehicle in accordance with an illustrative embodiment.

FIG. 6 depicts a flowchart of a process for evaluating system impact of wiring updates for a vehicle in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in test procedure generating system 200 in computer system 250 in FIG. 2.

Process 600 begins by receiving input of the wiring updates (operation 602).

Operational and structural information about the vehicle is retrieved from a number of databases (operation 604).

A number of disturbed system impact metrics resulting from the wiring updates are determined according to the wiring updates and operational and structural information about the vehicle (operation 606).

A first set of test procedures correlated with the disturbed system impact metrics is generated from a maintenance manual (operation 608). An impact estimate of the first set of test procedures is generated in near real-time (operation 610).

A second set of test procedures for wires not referenced in the maintenance manual is generated from non-maintenance manual sources (operation 612). The non-maintenance manual sources might comprise cataloged operational checks from prior wiring updates and/or subject matter expert developed procedures.

The first set of test procedures are combined with the second set of test procedures into a single optimized process flow according to user-specified optimization parameters (operation 614). The the user-specified optimization parameters might comprise at least one of tooling, length of procedure, allowed configurations, minimizing configuration changes, or minimizing tooling changes.

A new standard test procedure is then created for addition to the maintenance manual based on the single optimized process flow (operation 616).

Process 600 then ends.

Figure 7:
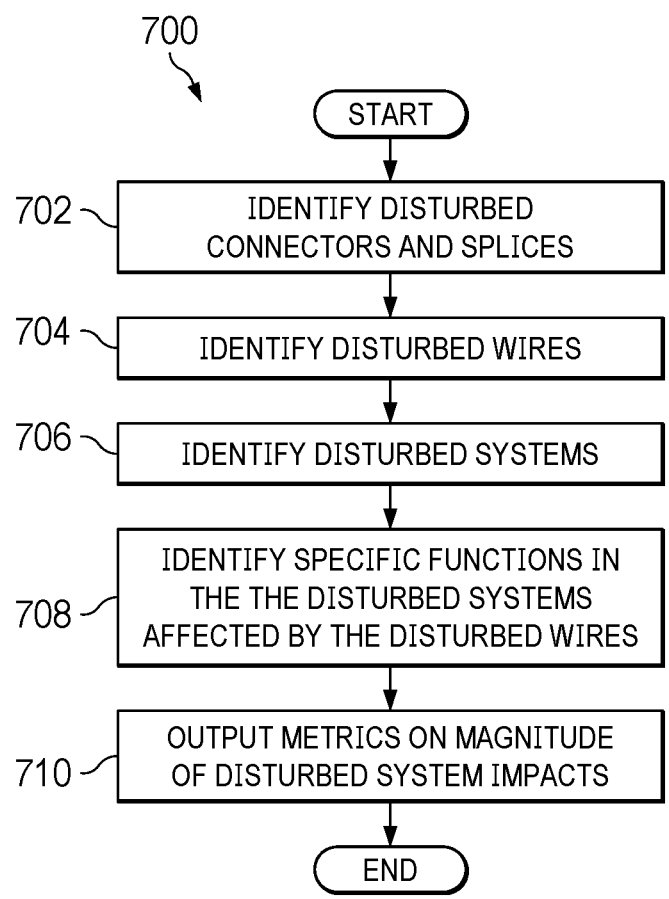
FIG. 7 depicts a flowchart of a process for determining the disturbed system impact metrics in accordance with an illustrative embodiment.

FIG. 7 depicts a flowchart of a process for determining the disturbed system impact metrics in accordance with an illustrative embodiment. Process 700 is a detailed example of operation 606 in FIG. 6.

Process 700 begins by identifying disturbed connectors and splices (operation 702). Next disturbed wires are identified (operation 704) as well as disturbed systems (operation 706).

Process 700 then identifies specific functions in the disturbed systems affected by the disturbed wires (operation 708) and outputs metrics on magnitude of disturbed system impacts (operation 710). Process 700 then ends.

Figure 8:
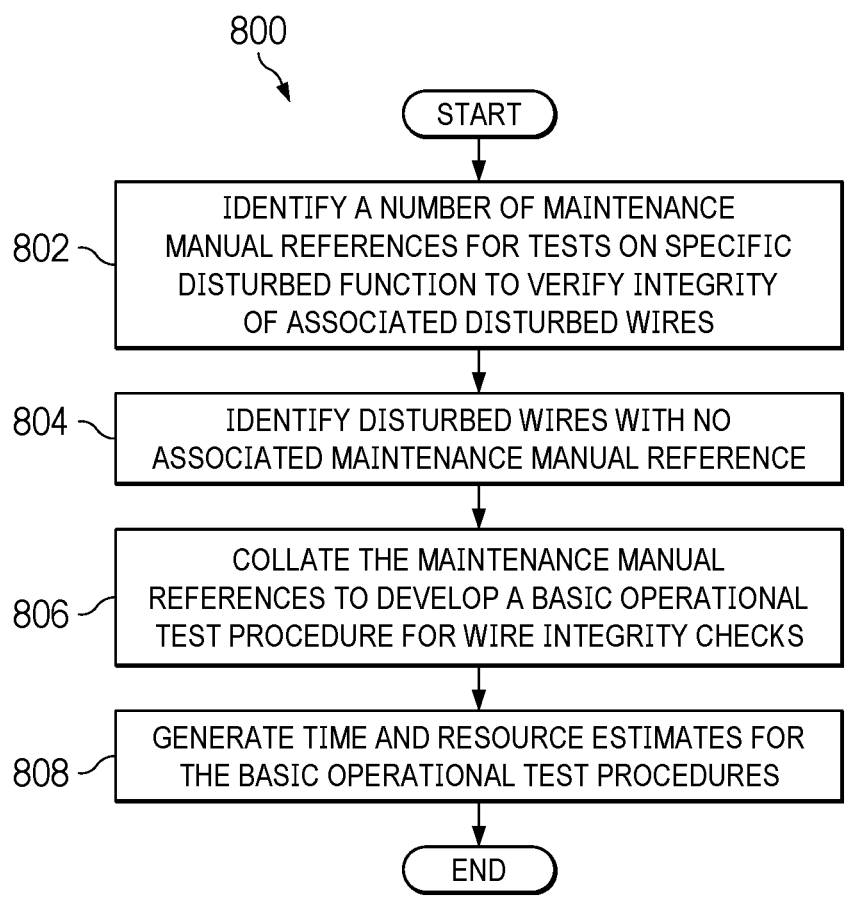
FIG. 8 depicts a flowchart of a process for generating a set of maintenance manual based test procedures in accordance with an illustrative embodiment.

FIG. 8 depicts a flowchart of a process for generating a set of maintenance manual based test procedures in accordance with an illustrative embodiment. Process 800 is a detailed example of operation 610 in FIG. 6.

Process 800 begins by identifying a number of maintenance manual references for tests on specific disturbed function to verify integrity of associated disturbed wires (operation 802).

Process 800 then identifies disturbed wires with no associated maintenance manual reference (804).

The maintenance manual references are collated to develop a basic operational test procedure for wire integrity checks (operation 806).

Time and resource estimates are then generated for the basic operational test procedure (operation 808). Process 800 then ends.

Figure 9:
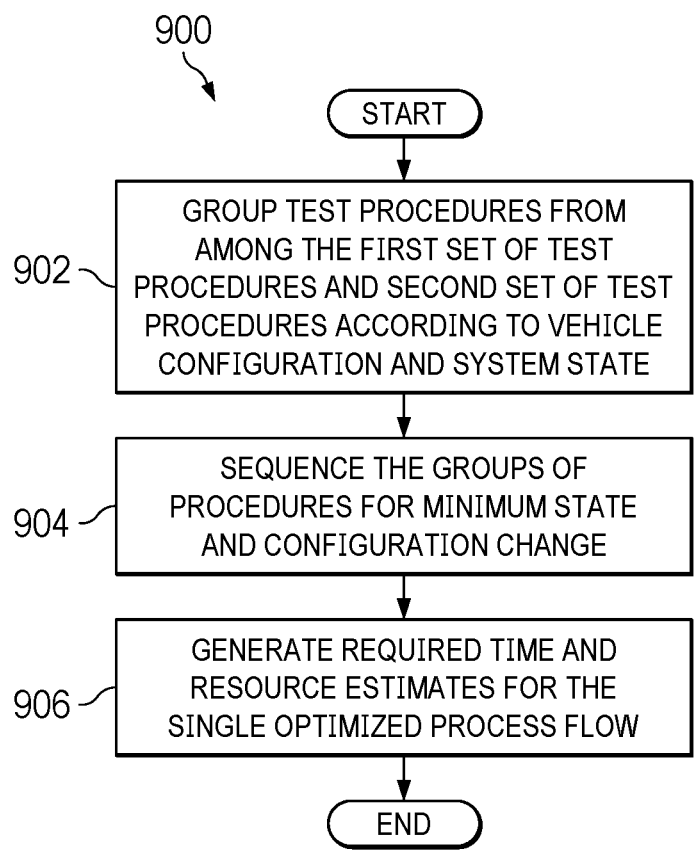
FIG. 9 depicts a flowchart of a process for combining the maintenance manual based test procedures and non-maintenance manual based test procedures into the single optimized process flow in accordance with an illustrative embodiment.

FIG. 9 depicts a flowchart of a process for combining the maintenance manual based test procedures and non-maintenance manual based test procedures into the single optimized process flow in accordance with an illustrative embodiment. Process 900 is a detailed example of operation 614 in FIG. 6.

Process 900 begins by grouping test procedures from among the first set of test procedures and second set of test procedures according to vehicle configuration and system state (operation 902).

The groups of procedures are then sequenced for minimum state and configuration change (operation 904).

Required time and resource estimates are generated for the single optimized process flow.

Process 900 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
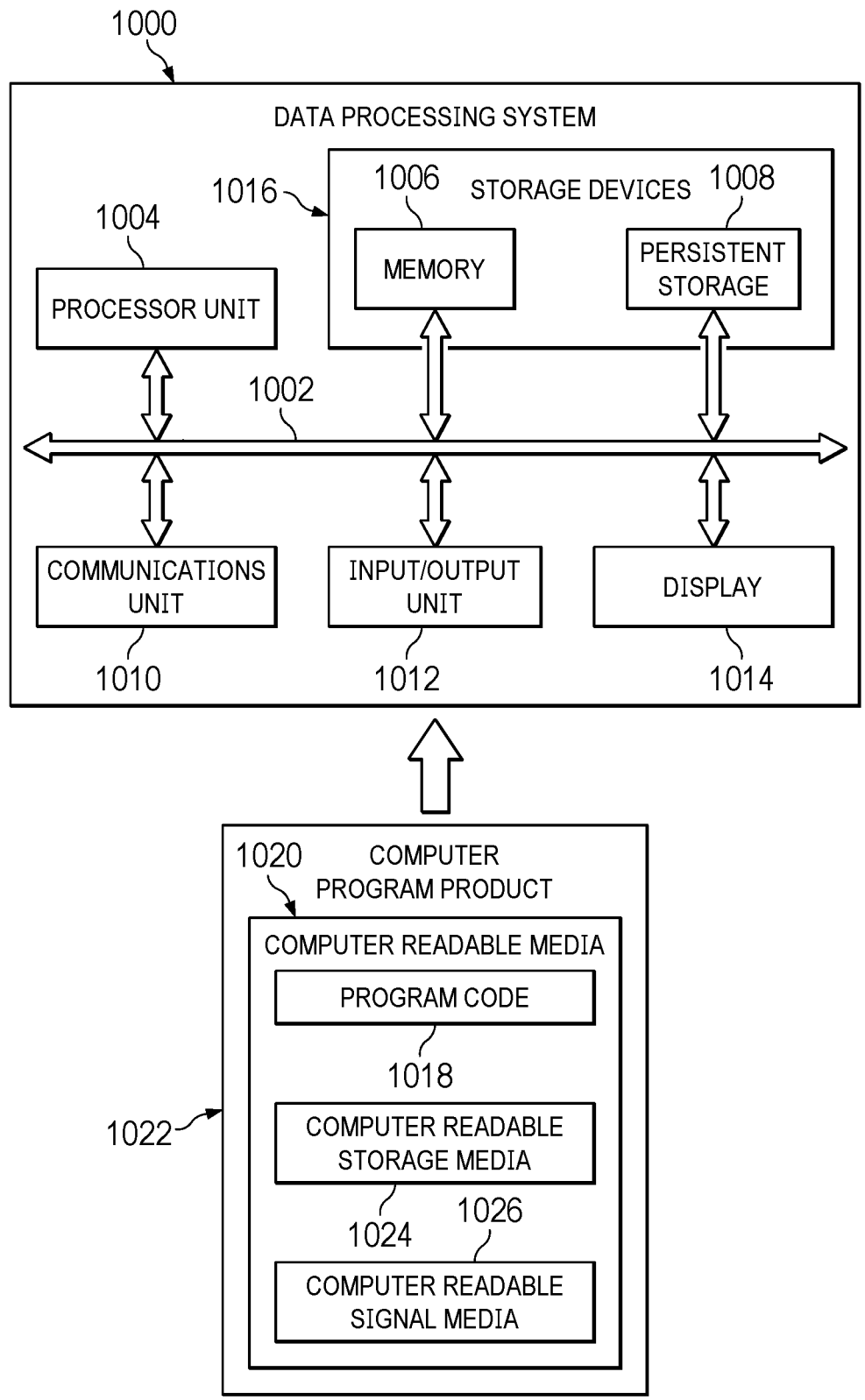
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement server computers 104 and 106 and client devices 110 in FIG. 1, as well as computer system 250 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUS).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of evaluating system impact of wiring updates for a vehicle, the method comprising:

using a number of processors to perform the operations of:
receiving input of the wiring updates;
retrieving operational and structural information about the vehicle from a number of databases;
determining, according to the wiring updates and operational and structural information about the vehicle, a number of disturbed system impact metrics resulting from the wiring updates;
generating, from a maintenance manual, a first set of test procedures correlated with the disturbed system impact metrics;
generating, in near real-time, an impact estimate of the first set of test procedures;
generating, from non-maintenance manual sources, a second set of test procedures for wires not referenced in the maintenance manual;
combining the first set of test procedures with the second set of test procedures into a single optimized process flow according to user-specified optimization parameters; and
creating a new standard test procedure for addition to the maintenance manual based on the single optimized process flow.

2. The method of claim 1, wherein the user-specified optimization parameters comprise at least one of:
tooling;
length of procedure;
allowed configurations;
minimizing configuration changes; or
minimizing tooling changes.

3. The method of claim 1, wherein determining the disturbed system impact metrics resulting from the wiring updates comprises:
identifying disturbed connectors and splices;
identifying disturbed wires;
identifying disturbed systems;
identifying specific functions in the disturbed systems affected by the disturbed wires; and
outputting metrics on magnitude of disturbed system impacts.

4. The method of claim 1, wherein generating the first set of test procedures comprises:
identifying a number of maintenance manual references for tests on specific disturbed function to verify integrity of associated disturbed wires;
identifying disturbed wires with no associated maintenance manual reference;
collating the maintenance manual references to develop a basic operational test procedure for wire integrity checks; and
generating time and resource estimates for the basic operational test procedure.

5. The method of claim 1, wherein the non-maintenance manual sources comprise cataloged operational checks from prior wiring updates.

6. The method of claim 1, wherein the non-maintenance manual sources comprise subject matter expert developed procedures.

7. The method of claim 1, wherein combining the first set of test procedures with the second set of test procedures into the single optimized process flow comprises:
grouping test procedures from among the first set of test procedures and second set of test procedures according to vehicle configuration and system state;
sequencing the groups of procedures for minimum state and configuration change; and
generating required time and resource estimates for the single optimized process flow.

8. A system for evaluating system impact of wiring updates for a vehicle, the system comprising:
a storage device that stores program instructions;
one or more processors operably connected to the storage device and configured to execute the program instructions to cause the system to:
receive input of the wiring updates;
retrieve operational and structural information about the vehicle from a number of databases;
determine, according to the wiring updates and operational and structural information about the vehicle, a number of disturbed system impact metrics resulting from the wiring updates;
generate, from a maintenance manual, a first set of test procedures correlated with the disturbed system impact metrics;
generate, in near real-time, an impact estimate of the first set of test procedures;
generate, from non-maintenance manual sources, a second set of test procedures for wires not referenced in the maintenance manual;
combine the first set of test procedures with the second set of test procedures into a single optimized process flow according to user-specified optimization parameters; and
create a new standard test procedure for addition to the maintenance manual based on the single optimized process flow.

9. The system of claim 8, wherein the user-specified optimization parameters comprise at least one of:
tooling;
length of procedure;
allowed configurations;
minimizing configuration changes; or
minimizing tooling changes.

10. The system of claim 8, wherein determining the disturbed system impact metrics resulting from the wiring updates comprises:
identifying disturbed connectors and splices;
identifying disturbed wires;
identifying disturbed systems;
identifying specific functions in the disturbed systems affected by the disturbed wires; and
outputting metrics on magnitude of disturbed system impacts.

11. The system of claim 8, wherein generating the first set of test procedures comprises:
identifying a number of maintenance manual references for tests on specific disturbed function to verify integrity of associated disturbed wires;
identifying disturbed wires with no associated maintenance manual reference;
collating the maintenance manual references to develop a basic operational test procedure for wire integrity checks; and
generating time and resource estimates for the basic operational test procedure.

12. The system of claim 8, wherein the non-maintenance manual sources comprise cataloged operational checks from prior wiring updates.

13. The system of claim 8, wherein the non-maintenance manual sources comprise subject matter expert developed procedures.

14. The system of claim 8, wherein combining the first set of test procedures with the second set of test procedures into the single optimized process flow comprises:
- grouping test procedures from among the first set of test procedures and second set of test procedures according to vehicle configuration and system state;
- sequencing the groups of procedures for minimum state and configuration change; and
- generating required time and resource estimates for the single optimized process flow.

15. A computer program product for evaluating system impact of wiring updates for a vehicle, the computer program product comprising:
- a computer-readable storage medium having program instructions embodied thereon to perform the steps of:
- receiving input of the wiring updates;
- retrieving operational and structural information about the vehicle from a number of databases;
- determining, according to the wiring updates and operational and structural information about the vehicle, a number of disturbed system impact metrics resulting from the wiring updates;
- generating, from a maintenance manual, a first set of test procedures correlated with the disturbed system impact metrics;
- generating, in near real-time, an impact estimate of the first set of test procedures;
- generating, from non-maintenance manual sources, a second set of test procedures for wires not referenced in the maintenance manual;
- combining the first set of test procedures with the second set of test procedures into a single optimized process flow according to user-specified optimization parameters; and
- creating a new standard test procedure for addition to the maintenance manual based on the single optimized process flow.

16. The computer program product of claim 15, wherein the user-specified optimization parameters comprise at least one of:
- tooling;
- length of procedure;
- allowed configurations;
- minimizing configuration changes; or
- minimizing tooling changes.

17. The computer program product of claim 15, wherein determining the disturbed system impact metrics resulting from the wiring updates comprises:
- identifying disturbed connectors and splices;
- identifying disturbed wires;
- identifying disturbed systems;
- identifying specific functions in the disturbed systems affected by the disturbed wires; and
- outputting metrics on magnitude of disturbed system impacts.

18. The computer program product of claim 15, wherein generating the first set of test procedures comprises:
- identifying a number of maintenance manual references for tests on specific disturbed function to verify integrity of associated disturbed wires;
- identifying disturbed wires with no associated maintenance manual reference;
- collating the maintenance manual references to develop a basic operational test procedure for wire integrity checks; and
- generating time and resource estimates for the basic operational test procedure.

19. The computer program product of claim 15, wherein the non-maintenance manual sources comprise at least one of:
- cataloged operational checks from prior wiring updates; or
- subject matter expert developed procedures.

20. The computer program product of claim 15, wherein combining the first set of test procedures with the second set of test procedures into the single optimized process flow comprises:
- grouping test procedures from among the first set of test procedures and second set of test procedures according to vehicle configuration and system state;
- sequencing the groups of procedures for minimum state and configuration change; and
- generating required time and resource estimates for the single optimized process flow.

* * * * *